(12) United States Patent
Mishra et al.

(10) Patent No.: US 9,780,973 B2
(45) Date of Patent: Oct. 3, 2017

(54) CHANNEL ESTIMATION SYSTEM FOR WIRELESS COMMUNICATION SYSTEM

(71) Applicants: Saurabh Mishra, Delhi (IN); Ankush Jain, Indore (IN)

(72) Inventors: Saurabh Mishra, Delhi (IN); Ankush Jain, Indore (IN)

(73) Assignee: NXP USA, INC., Austin, TX (US)

( * ) Notice: Subject to any disclaimer, the term of this patent is extended or adjusted under 35 U.S.C. 154(b) by 276 days.

(21) Appl. No.: 14/635,936

(22) Filed: Mar. 2, 2015

(65) Prior Publication Data

US 2016/0261433 A1     Sep. 8, 2016

(51) Int. Cl.
H04L 25/02     (2006.01)

(52) U.S. Cl.
CPC ...... H04L 25/0212 (2013.01); H04L 25/0218 (2013.01); H04L 25/0228 (2013.01)

(58) Field of Classification Search
CPC .................. H04L 25/0212; H04L 25/0228
See application file for complete search history.

(56) References Cited

U.S. PATENT DOCUMENTS

| | | | |
|---|---|---|---|
| 7,778,151 B2 | 8/2010 | Bertrand et al. | |
| 2005/0157801 A1* | 7/2005 | Gore | H04L 25/0202 375/260 |
| 2005/0282568 A1* | 12/2005 | Keerthi | H04L 7/041 455/502 |
| 2006/0203932 A1* | 9/2006 | Palanki | H04B 1/69 375/295 |
| 2007/0177729 A1* | 8/2007 | Reznik | H04K 1/00 380/44 |
| 2008/0063041 A1* | 3/2008 | Galperin | H04L 25/0307 375/233 |
| 2008/0137525 A1* | 6/2008 | Liu | H04L 25/0232 370/203 |
| 2009/0109908 A1 | 4/2009 | Bertrand et al. | |
| 2011/0261716 A1 | 10/2011 | Kim et al. | |
| 2012/0182857 A1 | 7/2012 | Bertrand et al. | |
| 2013/0039234 A1* | 2/2013 | Li | H04B 7/0619 370/280 |
| 2013/0044621 A1 | 2/2013 | Jung et al. | |
| 2014/0110677 A1 | 4/2014 | Zhang | |
| 2016/0173248 A1* | 6/2016 | Kerhuel | H04L 5/00 370/328 |
| 2016/0249316 A1* | 8/2016 | Kudekar | H04W 64/00 |

* cited by examiner

*Primary Examiner* — Andrew Chriss
*Assistant Examiner* — Voster Preval
(74) *Attorney, Agent, or Firm* — Charles E. Bergere

(57) ABSTRACT

A receiver circuit for estimating a state of an uplink channel between a wireless communication unit and a base station in a wireless communication system computes a conditioned Channel Impulse Response (CIR), the amount of conditioning being based on the noise present in the channel. A CIR and a Noise Variance are estimated from a Sounding Reference Signal received from the wireless communication unit. The estimated CIR is conditioned by comparing it with an adaptive threshold value selected from a look up table that lists threshold values against Noise Variance values. The threshold value further conditions the CIR to eliminate noise and interference. The conditioned CIR is converted into the frequency domain and used to provide a channel gain estimate which, together with noise estimates, is used to determine a Signal to Interference Noise Ratio (SINR) for the channel.

14 Claims, 4 Drawing Sheets

CHANNEL ESTIMATION SYSTEM FOR WIRELESS COMMUNICATION SYSTEM

BACKGROUND

The present invention relates generally to signal processing circuits and communications network devices and, more particularly to a system for channel estimation in a wireless communication network.

Wireless communication systems are well known. For example the $3^{rd}$ Generation (3G) of mobile telephone standards and technology developed by the 3rd Generation Partnership Project (3GPP™) has generally been developed to support macro-cell mobile phone communications. Such macro cells utilise high power base stations (NodeBs in 3GPP parlance) to communicate with wireless communication units (or User Equipments (UEs)) within a relatively large geographical coverage area.

Lower power and therefore smaller coverage area cells are a recent development within the field of wireless cellular communication systems. Such small cells are deployed for effective communication in coverage areas supported by low power base stations. The terms "picocell" and "femtocell" are often used to mean a cell with a small coverage area. Herein, the term "small cell" means any cell having a small coverage area and includes "picocells" and femtocells. These small cells are intended to augment the wide area macro network and support communications to UEs in a restricted, for example, indoor environment.

Communications systems and networks are developing towards a broadband mobile system and the 3rd Generation Partnership Project has proposed a Long Term Evolution (LTE) and an advanced (LTE-A) solution where a UE communicates over the wireless link with an evolved Node B (eNode B). The low power base stations (or 'access points') that support small cells in LTE are sometimes referred to as Evolved Home Node Bs (eHNB). OFDMA (orthogonal Frequency Division Multiple Access) and SC-FDMA (single carrier FDMA) access schemes were chosen for the down-link (from NodeB to UE) and up-link (from UE to NodeB) respectively in the LTE system. UEs are time and frequency multiplexed on a physical uplink shared channel (PUSCH).

One uplink reference signal, the Sounding Reference Signal (SRS) is defined in support of frequency dependent scheduling, link adaptation, power control and uplink synchronization maintenance, which are functions handled above the Physical Layer, mainly at layer 2. The main purpose of the SRS is to allow the eNodeB to estimate a UE's radio channel information on time and frequency resources possibly different from those where it is scheduled. SRS is typically used to estimate channel estimates and gains across the system bandwidth, Noise Variance (NV), timing offset, frequency offset, Doppler offset and other channel state parameters. SRS processing typically computes a signal to interference plus noise ratio (SINR) measurement from the channel estimates and noise variance. However, current computational methods for deriving useful metrics from the SRS are not always optimum for macro cell scenarios where there are few users or for small cell applications. Furthermore, the FAPI (Femto Application Platform Interface) initiative stipulates that an estimation of SINR be done on a per resource block (RB) basis. However, this requirement consumes significant processing resources.

Therefore it would be advantageous to provide a means for improving the reliability of an estimated CIR and SINR with reduced computation complexity.

BRIEF DESCRIPTION OF THE DRAWINGS

The invention, together with objects and advantages thereof, may best be understood by reference to the following description of preferred embodiments together with the accompanying drawings in which.

DETAILED DESCRIPTION OF PREFERRED EMBODIMENTS

Figure 1:
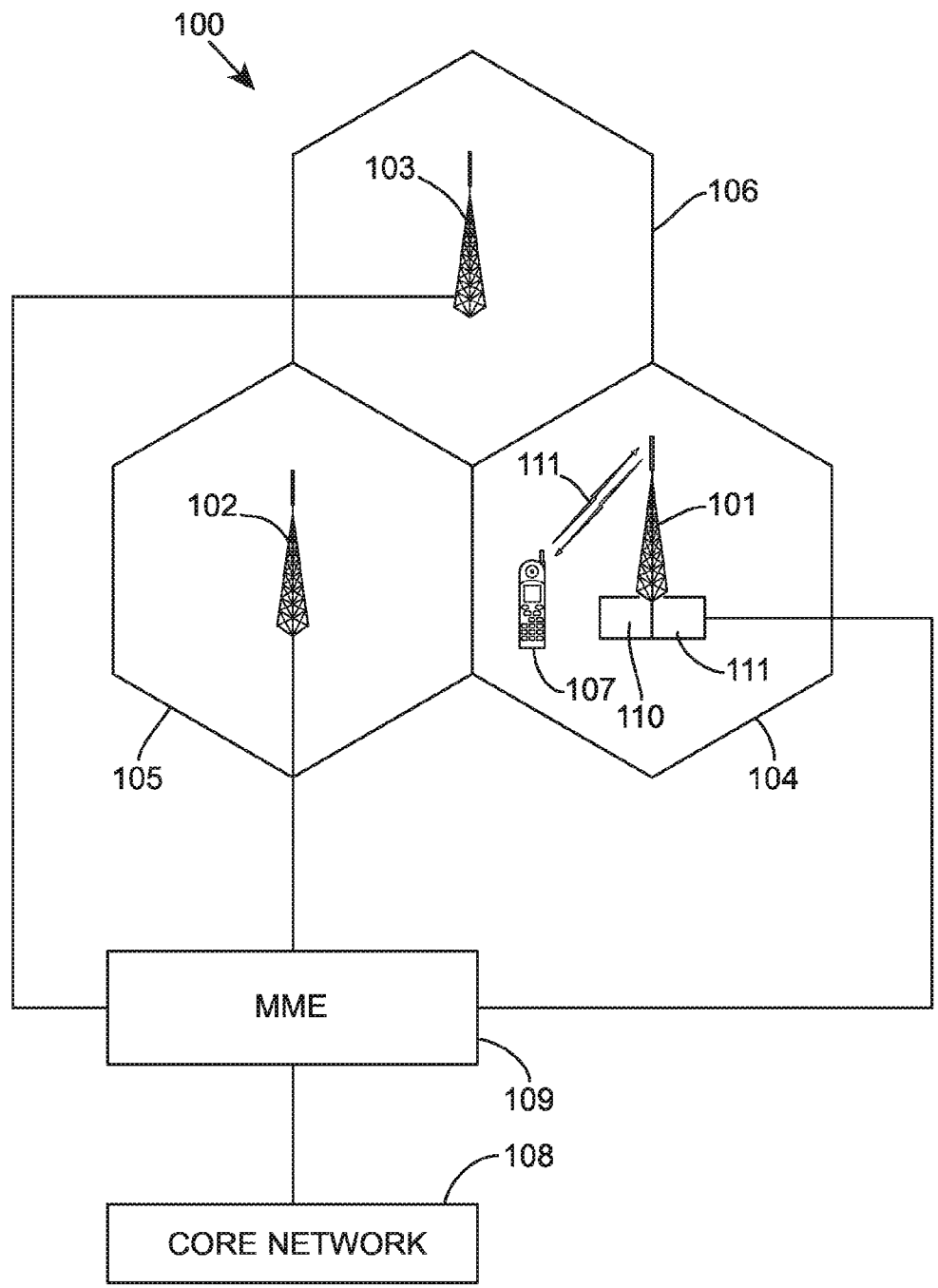
FIG. 1 is a block diagram of a wireless communication system in which an embodiment of the present invention finds application.

The detailed description set forth below in connection with the appended drawings is intended as a description of presently preferred embodiments of the invention, and is not intended to represent the only forms in which the present invention may be practised. It is to be understood that the same or equivalent functions may be accomplished by different embodiments that are intended to be encompassed within the spirit and scope of the invention. In the drawings, like numerals are used to indicate like elements throughout. Furthermore, terms "comprises," "comprising," or any other variation thereof, are intended to cover a non-exclusive inclusion, such that module, circuit, device components, structures and method steps that comprises a list of elements or steps does not include only those elements but may include other elements or steps not expressly listed or inherent to such module, circuit, device components or steps. An element or step proceeded by "comprises . . . a" does not, without more constraints, preclude the existence of additional identical elements or steps that comprises the element or step.

In one embodiment, the present invention provides a method for estimating a state of an uplink channel between a wireless communication unit and a base station in a wireless communication system. The method includes, at the base station, receiving a reference signal transmitted by t208e wireless communication unit; estimating a channel impulse response (CIR) for the uplink channel from the received reference signal; estimating a value of a channel noise parameter for the uplink channel; comparing the value of the estimated channel noise parameter with a list of channel noise parameter values stored in a look up table of channel noise parameter values versus threshold values; selecting a threshold value corresponding to the estimated channel noise parameter value; and comparing the selected threshold value with the estimated CIR to produce a conditioned CIR.

In another embodiment, the present invention provides receiver circuitry for estimating a state of an uplink channel between a wireless communication unit and a base station in a wireless communication system. The receiver circuitry comprises a signal processor and a memory operably coupled to the signal processor. The memory includes a pre-stored table of channel noise parameter values versus threshold values. The signal processor includes: a first signal processing circuit for receiving a reference signal transmitted by the wireless communication unit, and for estimating a CIR for the uplink channel from the received reference signal; a second signal processing circuit for estimating a value of a channel noise parameter for the uplink channel; and a third signal processing circuit for comparing the estimated channel noise parameter value with the list of channel noise parameter values in the memory and selecting a threshold value corresponding to the estimated channel noise value, and comparing the selected threshold value with the estimated CIR to produce a conditioned CIR.

The embodiments can be applied to LTE or any other wireless communications system or network.

In one exemplary embodiment, in a receiver, for each antenna carrier, in-phase and Quadrature-phase samples corresponding to a SRS symbol are selected and a Fast Fourier Transform (FFT) is performed to generate frequency domain data. Based on the user specific SRS allocation, sub-carriers are selected for further processing. An adaptive threshold value is selected for CIR conditioning in order to improve a channel gain estimate. A pre-configured look up table is used for selection of the appropriate threshold value based on the noise present. Threshold values stored in the look up table correspond to Noise Variance levels expected in the working SINR conditions. The higher the Noise Variance, the higher the selected threshold value. This contrasts with known methods of applying a constant threshold value and has the advantage of reducing the impact of noise levels in the channel gain estimates.

In one exemplary embodiment, a method for estimating Noise Variance employs detecting noise from a sub-carrier that is not used for uplink transmission, that is, one containing no signal energy. For example, in the case of a single comb SRS transmission, sub-carriers associated with another comb are used for the Noise Variance (NV) estimate. Advantageously, this method is less demanding on processing power than other, known methods. In one embodiment, the estimation of a NV is performed in the frequency domain. Advantageously, NV estimation using such a frequency domain method is unbiased by the number of UEs present in the relevant cell, fading and/or timing misalignments, as can be the case for time domain-based estimates. Based on such a computed NV estimate, a threshold value is selected from the look up table. In one embodiment, the selected threshold is normalized based on the strongest path of the CIR. The normalized threshold is then used to condition the CIR.

Herein, the term 'Channel Impulse Response' (CIR) is used to represent time domain responses of channel taps, and the phrase 'channel gain estimates' is used to represent the gain at frequency bins/tones/subcarriers in an allocated bandwidth.

Referring now to FIG. 1, an example of a wireless communications network 100 that in this example is a LTE network is shown. The network 100 includes three base stations or eNodeBs 101, 102 and 103. Each of the base stations 101, 102 and 103 supports respective coverage areas or cells 104, 105 and 106. The cells 104, 105, 106 can be a macro cell having a radius of several kilometers, for example, or a small cell such as a pico cell or a femto cell. A user equipment (UE) 107 is shown located in cell 104 and so within the coverage area of the base station 101. Each base station 101, 102, 103 is operably coupled to a core network 108 via a Mobility Management Entity (MME) 109.

The base station 101 transmits signals on a downlink to the UE 107 by virtue of a transmitter 110 and receives signals from UE 107 on an uplink by virtue of a receiver 111. The base station 101 can configure the UE 107 for periodic uplink sounding reference signal (SRS) transmission. The SRS is transmitted as a SC-FDMA signal to support frequency-selective scheduling. On receiving the SRS signals, the receiver 111 in the base station 101 estimates uplink channel state information, which includes channel impulse responses and channel estimates, gain estimates and Noise Variance (NV) as mentioned above, from the SRS transmissions. The base stations 102 and 103 are typically similarly provided with a receiver and a transmitter (not shown). Typical SRS transmissions have a symbol structure and simultaneous SRS transmissions can be transmitted from multiple UEs located in a cell using the same Resource Blocks (RB). Typically, SRS are transmitted every even sub-carrier if the Sounding Reference transmission comb index is set to '0' and every odd sub-carrier if it is set to '1.'

For effective utilization of the available bandwidth for communications in the network 100, particularly as the number of users is constantly growing, channel awareness is highly desirable. SRS transmissions from UEs are used by the base station 101 to estimate the uplink channel properties for all users present across a system bandwidth.

Figure 2:
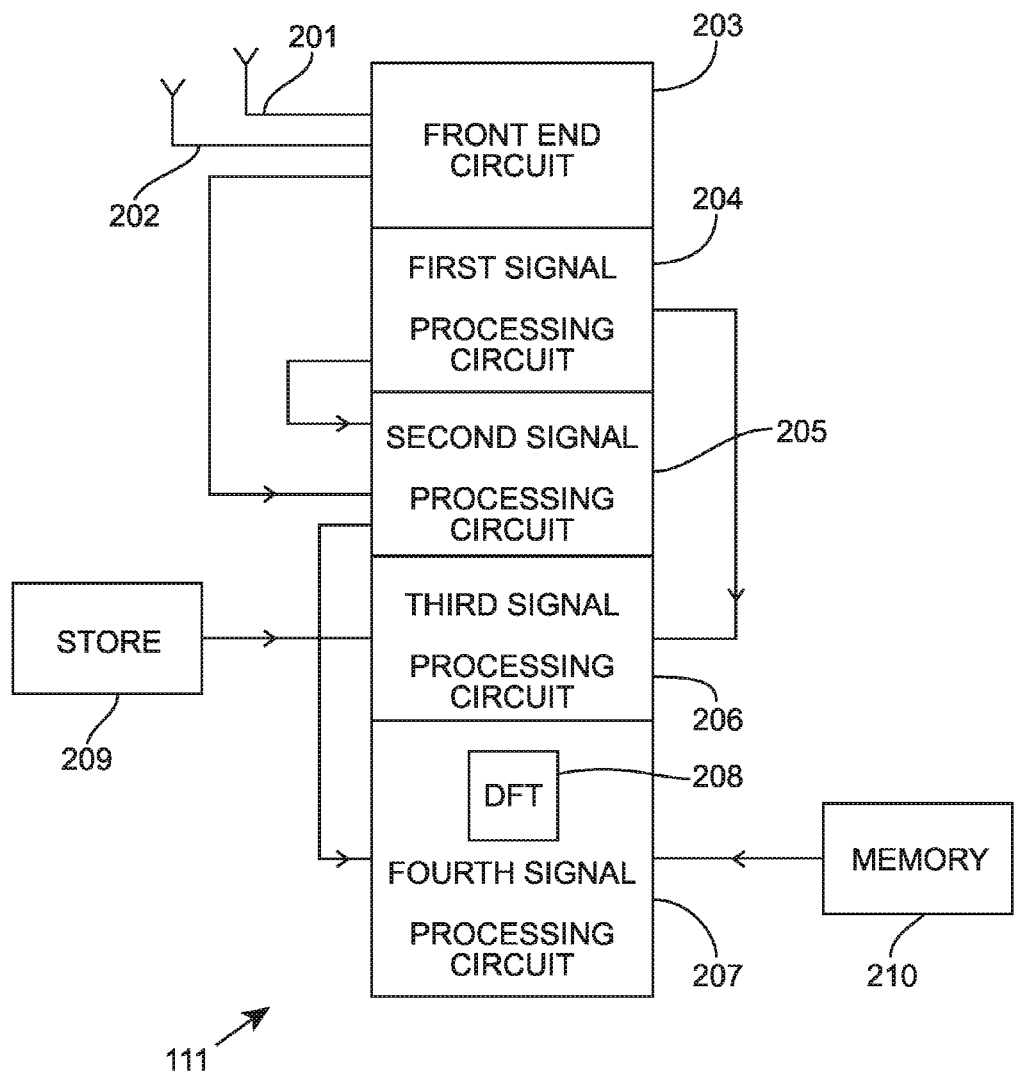
FIG. 2 is a schematic block diagram of a base station receiver in accordance with an embodiment of the invention.

FIG. 2 is a simplified block diagram illustrating components of the receiver 111. The receiver 111 includes one or more antennas 201, 202 operably coupled to a conventional front end circuit 203. In addition to transmitting downlink signals, the antennas 201, 202 can receive uplink Sounding Reference Signals and other transmissions from one or more UEs. The front end circuit 203 typically includes signal processing functionality for performing functions such as demodulation, down-conversion, digital sampling, decoding and detecting symbols from a received transmission, as is known in the art. The receiver 111 also includes a signal processor that comprises first, second, third and fourth signal processing circuits 204, 205, 206, and 207. The fourth signal processing circuit 207 includes a Discrete Fourier Transform (DFT) circuit 208. A first memory 209 is operably coupled to the third signal processing circuit 206 and a second memory 210 is operably coupled to the fourth signal processing circuit 207. The first memory 209 is preconfigured with a look up table (LUT) of uplink channel noise parameter values versus threshold values. The second memory 210 is preconfigured with a LUT of linear values of parameters versus db values of the parameters.

The first signal processing circuit 204 is operably coupled to the front end circuit 203 and receives a decoded Reference Sounding Signal from the front end circuit 203. The first signal processing circuit 204 estimates a CIR for the uplink channel using the received Sounding Reference Signal, in accordance with conventional techniques. The CIR estimate is output to the third signal processing circuit 206 for conditioning in a manner to be explained below.

The second signal processing circuit 205 is operably coupled to the front end circuit 203 and also receives the decoded Reference Sounding Signal. The second signal processing circuit 205 estimates a NV for the uplink channel. In one embodiment, the NV is estimated in the frequency domain and by using subcarriers that are not used for uplink signal transmission. The SRS transmission is a single comb transmission and subcarriers associated with another comb are used for the NV estimate. The estimated NV is output from the second signal processing circuit 205 to the third signal processing circuit 206, which also receives the estimated CIR from the first signal processing circuit 204.

The third signal processing circuit 206 conditions the received estimated CIR using a threshold value selected from the LUT in the first memory 209. In this embodiment, the LUT of the first memory 209 is populated with pre-computed, threshold values corresponding to NV levels that are expected in the working SINR conditions. Conditioning a CIR normally involves comparing the CIR with a constant threshold value in order to filter the noise component of the CIR to reduce the mean square area error at low SINRs.

Channel estimates are generally influenced by noise present. Hence, filtering is usually done before conversion to the frequency domain where a final channel gain estimate may be made. However, using a constant threshold value can degrade performance of the channel state estimations in cases where the SINR is comparatively high. In such cases an optimum mean square error is not achievable. The present invention overcomes this drawback by applying an adaptive threshold to the estimated CIR, where the threshold value used is dependent on the noise levels present in the relevant channel. Hence, a threshold value corresponding to the estimated NV is selected by the third signal processing circuit 206 from the LUT in the first memory 209 and used to condition the estimated CIR. In one embodiment, the LUT of the first memory 209 is populated with values of SINR versus threshold values. The lower the noise variance (that is for a comparatively high SINR), the lower the threshold value. CIR conditioning improves (subsequent) estimations of channel gain.

In this embodiment, prior to conditioning the estimated CIR using the selected threshold value, the selected threshold value is normalised. Normalisation of the selected threshold value is performed in the third signal processing circuit 206 and is based on the strongest path of the CIR. In particular, a threshold is normalised based on the maximum element in the CIR array. For example, if a threshold 'Th' is decided based on a noise level and the maximum component of the CIR array is 'L,' then the normalised threshold is equal to Th*L. Hence Th*L is used as the threshold value for the CIR conditioning.

To condition the CIR estimate, in the third signal processing circuit 206 the selected (and normalised) threshold value (Th*L) is compared with the (raw) CIR estimate from the first signal processing circuit 204. Any element in the CIR estimate that is less than the selected, (normalised) threshold is assumed to be noise and/or interference and is forced to zero. Otherwise, the CIR estimate is set to equal the raw CIR estimate. This procedure produces an almost unbiased estimation of a CIR. The conditioned CIR is then output to the fourth signal processing module 207 for further processing.

The fourth signal processing circuit 207 computes a SINR for the uplink channel and determines the SINR in a FAPI-compliant format. The FAPI-compliant format involves reporting the SINR for each resource block. A conditioned CIR is received from the third signal processing circuit 206 and converted to the frequency domain in a conventional manner by the DFT circuit 208. After the conversion, the fourth signal processing circuit 207 computes an estimated channel gain using conventional techniques. In the fourth signal processing circuit 207, the estimated channel gain (Ps) is factored into two components. A first component corresponds to the exponent position (the leading 1 position; that is, 'E') of the channel gain and another as the residue (Rs) of the channel gain, where $Rs=Ps/2^{(Es)}$ and Es is set to (E+1) to ensure that Rs is less than 1. The fourth signal processing circuit 207 is arranged to convert the (linear) value for Es to db using a logarithmic approach. The fourth signal processing circuit 207 reads the LUT in the second memory 210 and extracts dB values for Rs that are equivalent to the computed linear values. The fourth signal processing circuit 207 then adds together the two dB values for Es and Rs to provide a channel gain estimate in dB.

The fourth signal processing circuit 207 also computes a channel noise estimate in dB in a similar fashion to the computation of the channel gain estimate described above. In this embodiment, the fourth signal processing circuit 207 receives an estimated NV (which is already represented in the frequency domain) from the second signal processing circuit 205. The NV estimate is factored into two components. A first component corresponds to the exponent position and another as the residue. The fourth signal processing circuit 207 converts the first component to a value in db using a logarithmic approach. The fourth signal processing circuit 207 reads the LUT in the second memory 210 and extracts a dB value equivalent to the computed linear value. The fourth signal processing circuit 207 then adds together the two dB values of the two components to provide a channel noise estimate in dB. A SINR is determined by subtracting the noise estimate (in dB) from the channel gain estimate. Using this approach reduces computational complexity of SINR estimation compared with other known techniques, especially when the SINR is computed per resource block.

Figure 3:
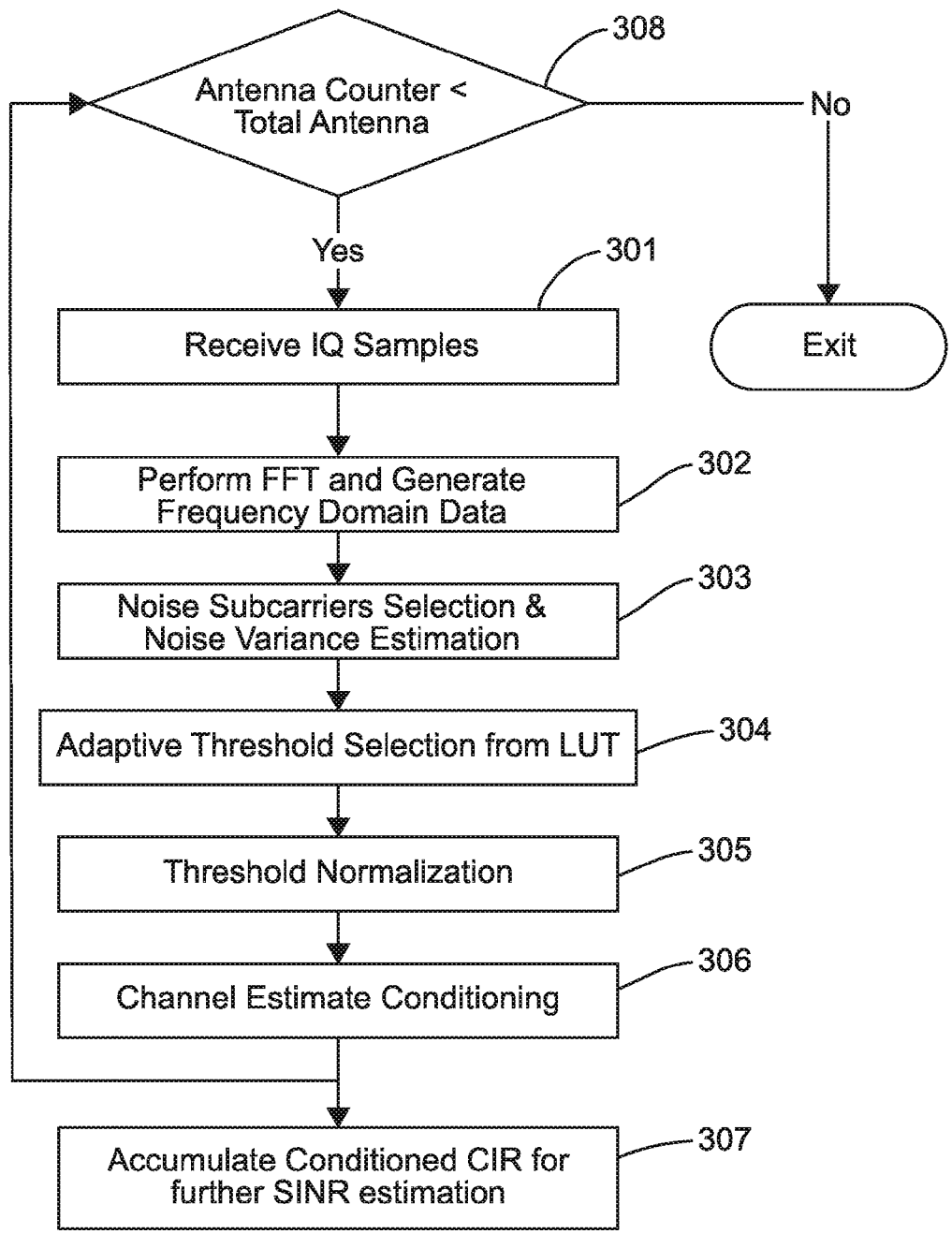
FIG. 3 is a flow chart illustrating a first method of operating an embodiment of the present invention.

A first method for estimating a state of an uplink channel will now be described with reference to the flow chart shown in FIG. 3. Starting at 301, in phase and quadrature (IQ) samples of a Sounding Reference Signal are received and a CIR is estimated. At 302, an inverse Fast Fourier transform (iFFT) is performed on the received samples to generate frequency domain data. At 303, subcarriers are selected and from these subcarriers, a NV for the uplink channel is determined. At 304, a threshold value corresponding to the determined NV is selected from a preconfigured LUT. At 305, the threshold value is normalised. At 306, the CIR estimate is conditioned by comparing it with the normalised threshold value. At 307, conditioned CIRs are accumulated for SINR computation and at 308, if it is determined that an antenna counter has not yet expired, then the process repeats from 301 onwards.

Figure 4:
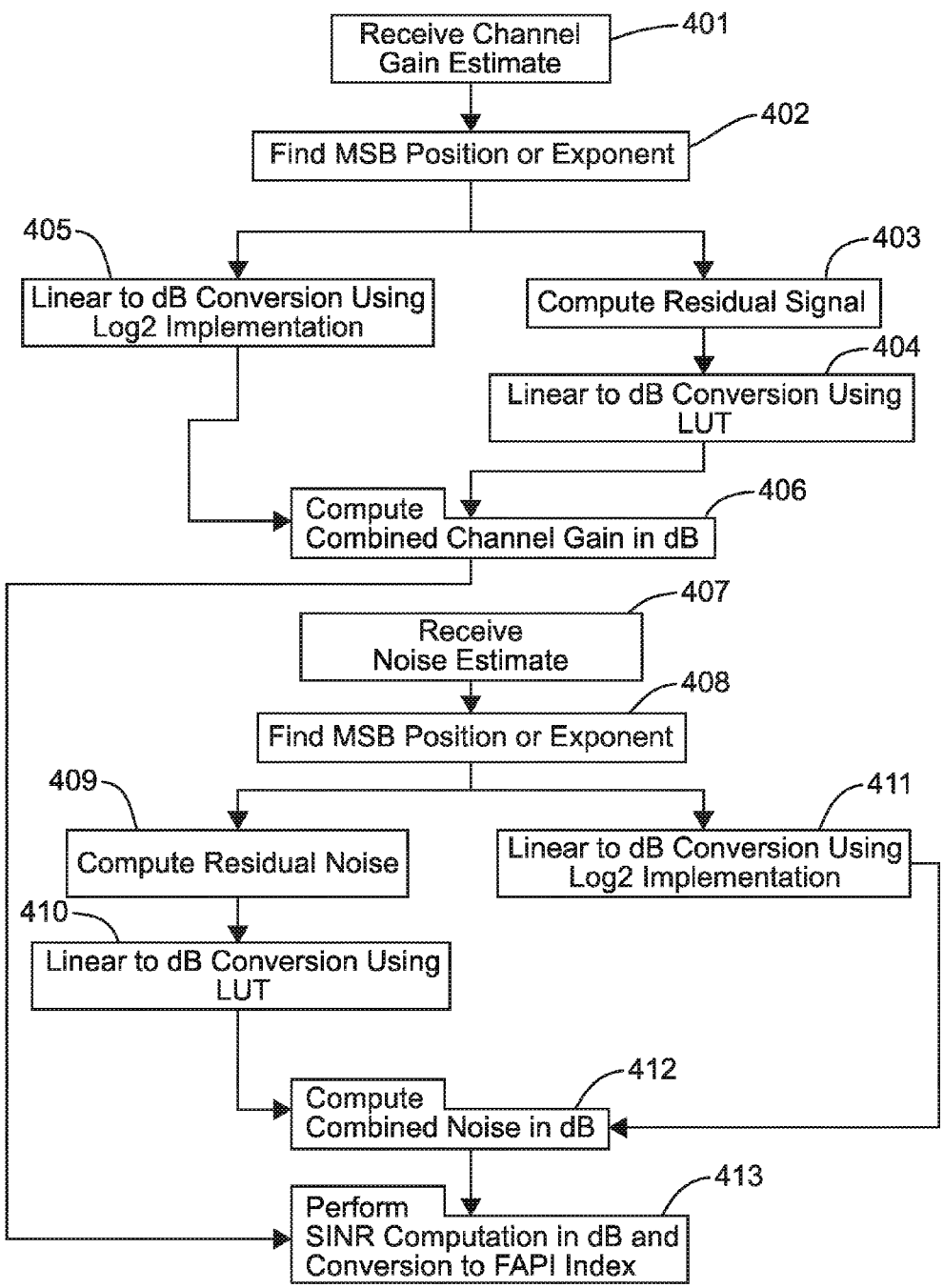
FIG. 4 is a flow chart illustrating a second method of operating an embodiment of the present invention.

A second method for estimating a state of an uplink channel will now be described with reference to the flow chart shown in FIG. 4. Starting at 401, a gain estimate is received. At 402, the MSB position, E, i.e., exponent is extracted and at 403 a residue is computed. The residue is converted, at 404, from linear dimensions to dB using a LUT. The exponent value is converted to db at 405 using a base 10 logarithmic approach. At 406, the exponent value and residue, both expressed in db are summed to produce a combined channel gain estimate in db. At 407, a noise estimate is received. At 409, the MSB position, E, i.e., exponent is extracted and at 409 a residue is computed. The residue is converted at 410 from linear dimensions to dB using a LUT. The exponent value is converted to db at 411 using a base 10 logarithmic approach. At 412, the exponent value and residue, both expressed in db are summed to produce a combined noise estimate in db. At 413, a SINR is computed by subtracting the combined noise estimate in db from the combined channel gain estimate in db. Also, the SINR is converted to a FAPI index. A FAPI index comprises information of eight bits with a resolution of 0.5 dB with a value of 0 to 255 representing −64 dB to 63.5 dB with a step size of 0.5 dB.

The signal processor of FIG. 2 or any of the first, second, third and fourth processors can for example be a microprocessor, such as a general purpose microprocessor, a microcontroller, a coprocessor, a digital signal processor or an embedded processor. A processor can have one or more processor cores, also referred to as CPUs. A CPU typically comprises an Arithmetic Logic Unit (ALU) that performs arithmetic and logic operations, and a Control Unit (CU) that extracts instructions from memory and decodes and executes the instructions. A processor may, in addition to the processor core, further comprise inputs/outputs and/or other components, such as communication interface, e.g. external bus interfaces, DMA (Direct Memory Access) controllers, and/or coprocessors and/or analog-to-digital converters and/or clocks and reset generation units, voltage regulators, memory (such as for instance flash, EEPROM, RAM), error correction code logic and/or timers, and/or hardware accelerators or other suitable components. The signal processor or entire receiver of FIG. 2 can for example be implemented as an integrated circuit, i.e. on one or more dies provided in a single integrated circuit. Alternatively, the examples may be implemented as any number of separate integrated circuits or separate devices interconnected with each other in a suitable manner. An integrated circuit device may comprise one or more dies in a single package with electronic components provided on the dies that form the modules and that are connectable to other components outside the package through suitable connections such as pins of the package and bond wires between the pins and the dies.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

Also for example, the examples, or portions thereof, may implemented as software or code representations of physical circuitry or of logical representations convertible into physical circuitry, such as in a hardware description language of any appropriate type.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between functional blocks, modules or circuits are merely illustrative and that alternative embodiments may merge functional blocks, modules or circuit elements or impose an alternate decomposition of functionality upon various functional blocks, modules or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. A method for estimating a state of an uplink channel between a wireless communication unit and a base station in a wireless communication system, the method comprising:
   at the base station, receiving a reference signal transmitted by the wireless communication unit;
   estimating a channel impulse response (CIR) for the uplink channel from the received reference signal;
   estimating a value of a channel noise parameter for the uplink channel, wherein the channel noise parameter is a Noise Variance;
   selecting a subcarrier of the reference signal that contains no signal energy for determining the Noise Variance;
   comparing the value of the estimated channel noise parameter with a list of channel noise parameter values stored in a table of channel noise parameter values versus threshold values;
   selecting a threshold value corresponding to the estimated channel noise parameter value;
   comparing the selected threshold value with the estimated CIR to produce a conditioned CIR; and
   using the conditioned CIR to adapt a signal transmitted over the uplink channel.

2. The method of claim 1, further comprising normalizing the selected threshold value based on a maximum value of a plurality of estimated CIRs.

3. The method of claim 1, further comprising setting a value for the conditioned CIR to zero if the estimated CIR is less than the selected threshold value.

4. The method of claim 1, wherein the reference signal is a Sounding Reference Signal.

5. The method of claim 1, further comprising performing an estimation of the Noise Variance in the frequency domain.

6. The method of claim 1, further comprising:
   estimating a channel gain by converting the conditioned CIR from a time domain to a frequency domain;
   factoring the estimated channel gain into two components representing, respectively, an exponent and a residue;
   expressing the two components in dB to produce two dB values; and
   combining the two dB values to produce an estimated channel gain in dB.

7. The method of claim 6, wherein expressing the residue in dB is performed using a pre-configured look up table.

8. The method of claim 6, further comprising:
expressing the estimated value for the channel noise parameter in dB by factoring the estimated value for the channel noise parameter into two components representing, respectively, an exponent and a residue, expressing the two components in dB, to produce two dB values; and
combining said two dB values to produce a channel noise estimate in dB.

9. The method of claim 8, wherein expressing the residue in dB is performed using a pre-configured look up table.

10. The method of claim 8, comprising:
subtracting the channel noise estimate in dB from the estimated channel gain in dB to produce a Signal to Interference Noise Ratio (SINR) for the uplink channel.

11. A receiver circuit for estimating a state of an uplink channel between a wireless communication unit and a base station in a wireless communication system, the receiver circuit comprising:
a signal processor; and
a memory operably coupled to the signal processor and pre-configured with a table of channel noise parameter values versus threshold values,
wherein the signal processor includes:
a first signal processing circuit for receiving a reference signal transmitted by the wireless communication unit, and estimating a channel impulse response (CIR) for the uplink channel from the received reference signal;
a second signal processing circuit for estimating a value for a channel noise parameter for the uplink channel, wherein the channel noise parameter is a Noise Variance, and selecting a subcarrier of the reference signal that contains no signal energy for determining the Noise Variance; and
a third signal processing circuit for comparing the estimated channel noise parameter value with the channel noise parameter values stored in the table and selecting a threshold value corresponding to the estimated channel noise value, and comparing the selected threshold value with the estimated CIR to produce a conditioned CIR.

12. The receiver circuit of claim 11, wherein the first signal processing circuit is arranged to determine a maximum value of a plurality of estimated Channel Impulse Responses, and the third signal processing circuit is arranged to normalize the selected threshold value based on said maximum value.

13. The receiver circuit of claim 11, wherein:
the memory includes a look up table containing linear to db conversion values; and
the signal processor comprises a fourth signal processing circuit operably coupled to the memory and arranged to:
receive the conditioned CIR from the third signal processing circuit and convert the received, conditioned CIR to an estimated channel gain;
receive an estimated value of a channel noise parameter; and
using the look up table, compute a Signal to Interference Noise Ratio (SINR) for the uplink channel by subtracting the estimated value of the channel noise parameter expressed in db from the estimated channel gain expressed in db.

14. The receiver circuit of claim 11 implemented in an integrated circuit.

* * * * *